Figure 1:
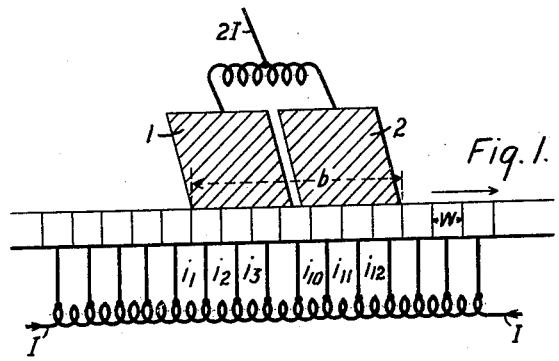

M. WALKER.
DYNAMO ELECTRIC MACHINE.
APPLICATION FILED SEPT. 30, 1916.

1,335,144.

Patented Mar. 30, 1920.
2 SHEETS—SHEET 1.

WITNESSES:
Fred. A. Lind.
O. W. Kennedy

INVENTOR
Miles Walker
BY
Wesley S. Carr
ATTORNEY

M. WALKER.
DYNAMO ELECTRIC MACHINE.
APPLICATION FILED SEPT. 30, 1916.

1,335,144.

Patented Mar. 30, 1920.
2 SHEETS—SHEET 2.

WITNESSES:
Fred. A. Lind.
O. W. Kennedy

INVENTOR
Miles Walker
BY
Wesley G. Carr
ATTORNEY

UNITED STATES PATENT OFFICE.

MILES WALKER, OF MANCHESTER, ENGLAND, ASSIGNOR TO WESTINGHOUSE ELECTRIC & MANUFACTURING COMPANY, A CORPORATION OF PENNSYLVANIA.

DYNAMO-ELECTRIC MACHINE.

1,335,144.   Specification of Letters Patent.   Patented Mar. 30, 1920.

Application filed September 30, 1916. Serial No. 123,024.

*To all whom it may concern:*

Be it known that I, MILES WALKER, a subject of the King of England, and a resident of Manchester, in the county of Lancaster, England, have invented a new and useful Improvement in Dynamo-Electric Machines, of which the following is a specification.

My invention relates to dynamo-electric machines of the commutator type having commutating poles or compensating windings, such as direct-current generators, motors, double-current machines, rotary converters, with or without boosters, and split-pole rotary converters, and it has for its object to provide improved methods of, and apparatus for, securing better commutation over wide variations in load and other conditions of operation in machines of this character.

In my Patent No. 1,158,598, Nov. 2, 1915, I have described a method of exciting the commutating poles of commutating machines, such as continuous-current generators and rotary converters, in which the commutating poles are automatically maintained at their right strength by magnetizing them with current from a divided brush. As therein described, the forward part of the brush, in the direction of rotation of the commutator cylinder, is connected in series with the commutating pole, so that, when the commutating pole tends to become too weak, the current is carried to the forward part of the brush to thus strengthen the pole; while, if the pole tends to become too strong, more current is collected by the rear part of the brush to thus weaken the pole. I have found that, with the connections described, the division of the current between the two halves of the brush results in a very powerful action, and the electromotive forces set up by the coil under commutation are amply sufficient to bring about the right distribution of current between the two halves of the brush. Thus, the insertion of a resistance several times greater than the resistance of the commutating-pole winding in series with one of the halves of the brush does not seriously alter the distribution of current, because a very slight increase of the current in the other half brings about a tendency for the first half to take its share, notwithstanding the resistance in series. This is because the electromotive force set up by the commutating pole in the conductors under it is large compared with the voltage drop in the commutating coils and under the brush.

Figure 2:
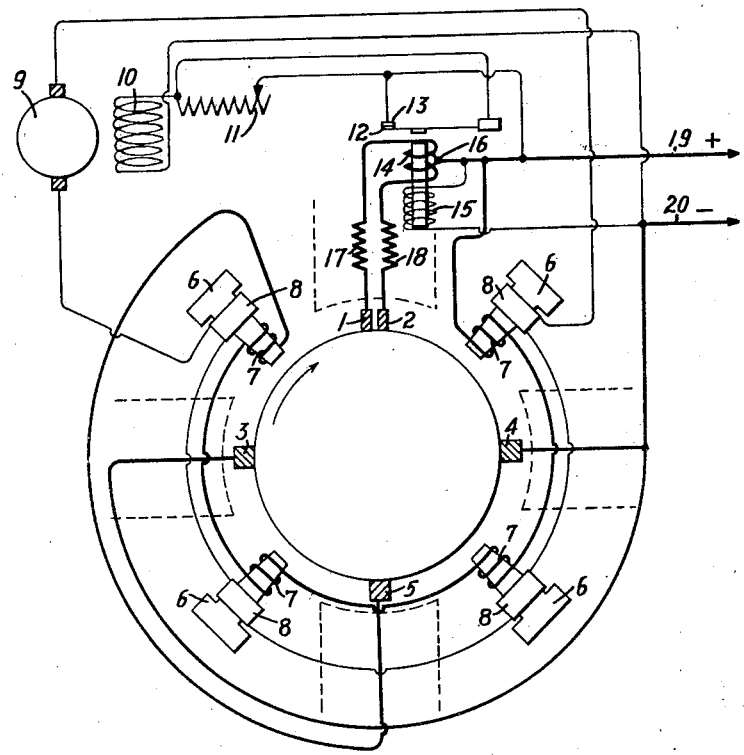
Figure 3:
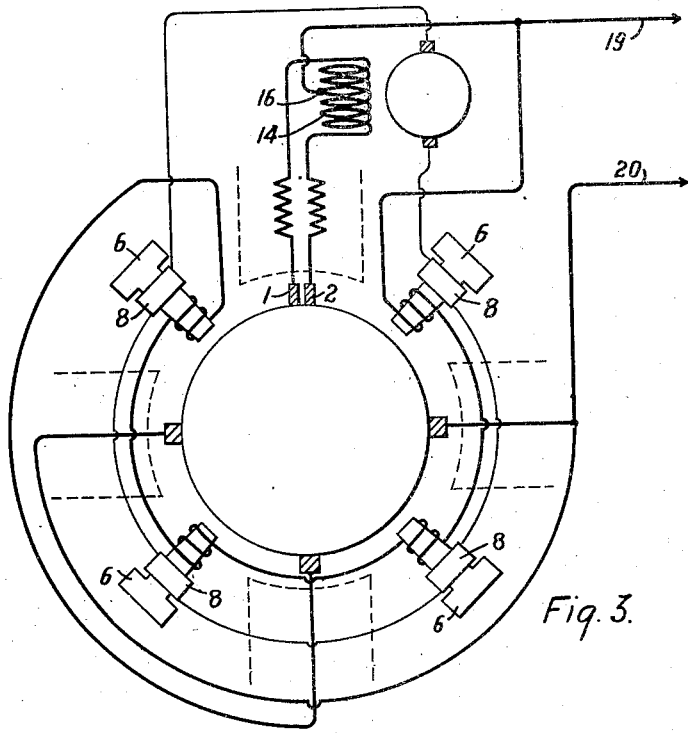
Figure 4:
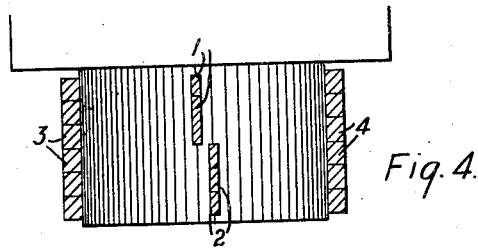

In the accompanying drawings, Figure 1 is a developed diagrammatic view showing a portion of a commutator cylinder and a divided brush coöperating therewith. Fig. 2 is a diagrammatic view of a dynamo-electric machine with my invention applied thereto. Fig. 3 is a diagrammatic view similar to Fig. 2 showing a modification of my invention. Fig. 4 is a plan view of a portion of a commutator cylinder showing the disposition of the brushes in Fig. 3, and Figs. 5, 6 and 7 are diagrammatic views showing various ways of connecting the double brush.

In the following discussion of the action of the double brush, the symbols which are applied to Fig. 1 are to be interpreted as follows:

$b$=width of the whole brush made up of the two halves.

$w$=width of one commutator bar.

$I$=current in the armature winding.

$2I$=current collected by the double brush.

$i$=current for the time being in any commutator bar.

$i_1, i_2, i_3$, etc., currents in the bars under the rear brush.

$i_{10}, i_{11}, i_{12}$, etc., currents in the bars under the forward brush.

$I_r = i_1 + i_2 + i_3 + \ldots$ current in the rear brush.

$I_f = i_{10} + i_{11} + i_{12} + \ldots$ current in the forward brush.

The theory is most conveniently stated if we assume that the bars are very narrow and that an indefinitely large number of them are under the brush. Under this condition, the current $i$, at any point, is proportional to the rate of change of current in the armature at that point.

The rate of change of $I$ during the beginning of the commutating period, depends on the strength of the commutating pole; so that, if the pole is strong, $I_r$ will be greater than $I_f$. If the commutating pole is weak, $I_r$ will be less than $I_f$. As the sum $i_1 + i_2 + i_3$, etc., and $i_{10}+i_{11}+i_{12}$, etc., must always be equal to $2I$, a quantity dependent only upon the load on the machine, it follows that if, in the early stages of the commutating period, $i_1$, $i_2$, $i_3$, etc., are too great, it may be that some of the quantities $i_{10}$, $i_{11}$, $i_{12}$, etc., will have to be negative, in order that the sum may be equal to $2I$. Thus, it comes about that, in the later stages of the commutating period, the rate of change of I is more dependent upon the necessity of bringing about this correct summation than upon the strength of the commutating pole. The contact resistance of the brushes, or the resistance of an arc under the toe of the brush, introduces differences of potential that bring about this correct summation in cases where the strength of the commutating pole does not bring about an even distribution of current under the brush. The voltage drop in the contact resistance under the brush is nearly a constant for normal current densities and does not differ much from the value of 1 volt unless the current density becomes abnormally great. Thus, it comes about that an even current distribution under a brush is a better criterion of the correct adjustment of the commutating pole than the voltage drop between commutator and brush at any point in the commutating zone. The voltage drop between commutator bar and brush depends not only upon current density but also upon other factors, such as the manner in which the brush is carried and the degree of movement of the brush in its holder.

In cases where it is desired to alter the excitation of the commutating pole at full load over a considerable range, in order to neutralize the effect of some magnetizing or demagnetizing influence (such, for instance, as is introduced by employing a booster driven by the rotary converter), it is found that the method proposed in my Patent No. 1,158,598 does not permit of a very wide range of change of excitation, for the following reason: a wide range of change of excitation necessarily involves a great difference between the currents carried, respectively, by the forward and the rear parts of the brushes. If, for instance, it is desired to reduce the excitation to one-fourth normal excitation, the forward part of the brush would be collecting only one-quarter of its normal current, while the rear part of the brush would be carrying $\frac{7}{4}$ of its normal current. It will thus be seen that the rate of change of current in the rear part of the brush would have to be seven times as great as the rate of change of current in the forward part of the brush; that is to say, it would be necessary to have a commutating pole for the rear part of the brush seven times as strong as is suitable for the commutation under the forward part of the brush; and, as both brushes are under the same commutating pole, it is obvious that good commutation under these conditions could not be brought about without the introduction of other factors.

According to the present invention, instead of passing the current from the double brush around the commutating poles, I cause it to actuate a relay device which controls the excitation of the commutating pole. In this way, a comparatively small change between the relative values of $I_r$ and $I_f$ can be made to bring about a very great difference in the excitation of the commutating poles.

Fig. 2 illustrates this method of carrying out my invention, in which the rear and forward parts 1 and 2, respectively, of the brush shown in Fig. 1 are mounted on one of the positive brush arms of the machine and a single brush 5 is mounted on the other positive arm. Additional brushes 3 and 4 are mounted on the negative brush arms. Commutating poles 6 are arranged intermediate the main poles, shown in dotted lines, and are provided with windings 7 connected in series with the brush 5. The commutating poles 6 are further provided with auxiliary exciting coils 8 which are energized from a suitable direct-current source, such as a small generator 9. The field-magnet winding 10 of the generator 9 is excited either from the mains 19 and 20 of the machine or from any independent source. A rheostat 11 is connected in series with the field coils 10 and is adapted to be short circuited by the relatively movable contact members 12 and 13 of a relay device. The movable contact member 12 may be of the well known vibrating type, the duration of the short circuit occurring at the contact members being controlled by the energization of the coils 14 and 15. The terminals of the coil 14 are connected to the brush parts 1 and 2, respectively, and an intermediate point 16 is connected to the positive main 19. The coil 15 is excited either from the mains of the machine or from an independent source.

The action of the machine is as follows: the current from the brush 5, or from additional positive brush arms, passes through the windings 7 of the commutating poles 6 and produces an excitation which is approximately proportional to the load. So long as the commutating poles are of the right strength, the current divides evenly between the brush parts 1 and 2, and, in passing through the two halves of the coil 14, produces no magnetic effect, so that the movable contact member 12 of the relay is drawn downwardly and the resistance 11 remains in circuit with the winding 10. Under these conditions, the electromotive force of the generator 9 is so reduced as to maintain the current in the coils 8 at a small value. If, on account of any disturbance or on account of the saturation of the iron of the commutating poles or for any other cause, the commutating poles 6 become too weak, the current $I_f$ from the forward part 2 of the brush will become greater than the current $I_r$ from the rear part 1 of the brush. The portion of the coil 14 between the brush part 2 and the main 19 will then exercise an opposite magnetizing effect with respect to the coil 15 and bring about the short circuiting of the rheostat 11 for a longer or a shorter period of time, according to the strength of the current $I_r$. This increases the magnetization of the winding 10 and increases the electromotive force of the generator 9 which accordingly supplies a greater current to the coils 8 to strengthen the commutating poles 6. If, on the other hand, the poles 6 become too strong, the current $I_r$ will be greater than the current $I_f$, and the coil 14 will operate in the opposite sense and produce a reduction of the current in the coils 8. Thus, a small relative change between the values of $I_r$ and $I_f$ may bring about a very great change in the excitation of the commutating poles 6.

If the machine is assembled in a symmetrical manner, and all the commutating poles are of the same strength at any instant, the distribution of the current under the brushes 1 and 2 is the same as the distribution of current under the brushes 5 and any other brush-arms, provided the resistances of the various parts of the circuit are so adjusted as to give each brush-arm its proper share of the load. In order to better secure this adjustment, I introduce resistors 17 and 18 having a low value in circuit with the brushes 1 and 2, so that the total drop of voltage between said brushes and the positive main 19 is the same as the drop between the brushes 5 and the positive main when the proper current is flowing in the respective brush arms. From what has been stated above as to the powerful action of the commutating poles in bringing about an even distribution of current between the brush halves 1 and 2, it will be understood that considerable differences in the contact resistances in the parts 1 and 2 will not greatly affect the values of $I_r$ and $I_f$, because these currents are controlled by the sums of $i_1+i_2+i_3+ \ldots$ and $i_{10}+i_{11}+i_{12}+ \ldots$ ; and, as $i$ is proportional to the rate of change of $I$, it is more affected by the strength of the pole than by the contact resistances. It will, in fact, be found that, if the value of the resistor 17 be increased and that of the resistor 18 be decreased over a considerable range, the values of $I_r$ and $I_f$ will be very little altered, notwithstanding the fact that the difference of potential between the brush 1 and the mains may be considerably more than the difference of potential between brush 2 and the mains. I am aware that it has been proposed to control a relay operating by the difference of potential between points in the commutating zone, and I make no claim here to such an arrangement.

An alternative way of controlling the current in the coils 8 is shown in Fig. 3. Here, the coil 14 constitutes the winding upon the field magnet of the generator 9. This method works in the same manner as described in connection with Fig. 2 except that, there being no sensitive relay, it requires a greater difference in the values of $I_r$ and $I_f$ in order to bring about a change in the excitation of the coils 8.

In locating the brush parts 1 and 2 on the commutator, I may either place them directly in tandem, so that the same parts of the commutator bars pass under one as pass under the other, or I may stagger them with respect to the commutator cylinder, as shown in Fig. 4, this being a method sometimes employed in connection with machines constructed under my patent aforementioned.

Figures 5, 6, 7:
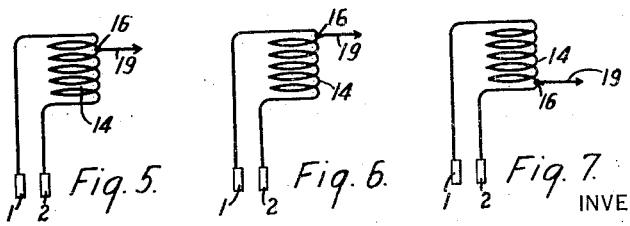

It will be understood that there are many ways in which the coil 14 may be used to operate a relay to influence the excitation of the commutating poles, the arrangements illustrated in Figs. 2 and 3 being by way of example only and not by way of limitation. The coil 14 may, for instance, be made to operate a regulator of the well-known Tirrill type arranged to directly control the excitation of the commutating poles. The positive main 19 may be connected to the middle of the coil 14, as shown in Fig. 2, or it may be connected to other points therein, as indicated in Figs. 5, 6 and 7, as may be found convenient or desirable, according to the requirements of the relay device employed in connection therewith.

I claim as my invention:

1. In a dynamo-electric machine of the commutator type, the combination with a commutating-pole exciting winding, an external source of current for energizing said winding and a main-current brush divided into two separate parts, of means dependent upon the difference in the value of the currents flowing in the respective parts of said brush for automatically controlling said current source to vary the excitation of said commutating pole.

2. In a dynamo-electric machine of the commutator type, the combination with a commutating-pole exciting winding, an auxiliary generator provided with voltage adjusting means and serving to energize said commutating-pole winding and a main-current brush divided into two separate parts, of means dependent upon the difference in the value of the currents flowing in the respective parts of said brush for automatically controlling the voltage of said generator.

3. In a dynamo-electric machine of the commutator type, the combination with a commutating-pole exciting winding, an external source of current for energizing said winding, load circuit terminals and a main-current brush divided into two separate parts, of a winding connected at its terminals to the parts of said brush and at an intermediate point to one of said load terminals for automatically controlling the voltage of said current source in accordance with the current in the respective parts of said winding.

4. In a dynamo-electric machine of the commutator type, the combination with a commutating-pole exciting winding, an auxiliary generator provided with a field-magnet winding having adjustable exciting means and serving to energize said commutating-pole winding, load-circuit terminals and a main-current brush divided into two separate parts, of a winding connected at its terminals to the parts of said brush and at an intermediate point to one of said load terminals for automatically controlling the excitation of the field-magnet winding of said generator to vary the excitation of said commutating pole.

5. In a dynamo-electric machine wherein the commutating axis shifts with changes of load, the combination with a commutating-pole exciting winding, and an external source of current for energizing said winding, of a main-current brush divided into two separated parts, and means whereby the current in the brush part in the direction of heavy-load shift of the commutating axis tends to increase the voltage of the said current source and whereby the current in the brush part in the direction of light-load shift tends to decrease the voltage of said source.

In testimony whereof, I have hereunto subscribed my name this thirteenth day of September, 1916.

MILES WALKER.

Witnesses:
 JAS. STEWART BROADFOOT,
 MARGARET S. MAYOH.